United States Patent [19]

Segner et al.

[11] Patent Number: 4,473,591
[45] Date of Patent: Sep. 25, 1984

[54] PROCESS FOR THE PRESERVATION OF GREEN COLOR IN CANNED VEGETABLES

[75] Inventors: Wayne P. Segner, DuPage; Thomas J. Ragusa, Joliet; W. Kenneth Nank, Hinsdale; William C. Hoyle, Palos Heights, all of Ill.

[73] Assignee: Continental Can Company, Inc., Stamford, Conn.

[21] Appl. No.: 449,914

[22] Filed: Dec. 15, 1982

[51] Int. Cl.³ .................. A23L 1/272; A23L 1/30
[52] U.S. Cl. ........................... 426/270; 426/74; 426/398; 426/540; 426/615
[58] Field of Search ............ 426/74, 131, 270, 322, 426/323, 325, 331, 398, 401, 407, 540, 615

[56] References Cited

U.S. PATENT DOCUMENTS

| | | | |
|---|---|---|---|
| 2,305,643 | 12/1942 | Stevenson et al. | 426/407 |
| 2,875,071 | 2/1959 | Malecki | 426/131 |
| 2,976,157 | 3/1961 | Malecki | 426/270 |
| 4,369,197 | 1/1983 | Basel et al. | 426/270 |

FOREIGN PATENT DOCUMENTS 266117  7/1970  U.S.S.R. .............................. 426/250

*Primary Examiner*—Raymond Jones
*Assistant Examiner*—Elizabeth J. Curtin
*Attorney, Agent, or Firm*—Paul Shapiro

[57] ABSTRACT

The natural color of canned green vegetables is retained by blanching the vegetables, prior to packing, in an aqueous solution of a metal ion selected from zinc and copper.

14 Claims, No Drawings

PROCESS FOR THE PRESERVATION OF GREEN COLOR IN CANNED VEGETABLES

BACKGROUND OF THE INVENTION

1. Field of the Invention

This invention relates to a process of preparing green peas, green beans, spinach and other like green vegetables for canning or freezing and is particularly related to a method of preparing green vegetables to preserve the color of the canned vegetable during processing and storage.

2. The Prior Art

In the conventional method of canning green vegetables such as green beans, peas and spinach, the vegetable after being washed, is subjected to a blanching operation of 3 to 5 minutes duration. The primary purpose of the blanch is to inactivate enzymes and expel air which would otherwise result in off-flavors.

After the blanching operation, the green vegetables are filled in cans, covered with a brine solution consisting of sugar and/or salt, and the cans are thereafter sealed and sterilized.

This method of canning of vegetables has the disadvantage that the canned product does not retain the fresh green color of the growing vegetable, but assumes a dull yellow-olive color which is unpleasant to the eye and, consequently, is not as appetizing as it might be if the fresh green color were retained. The undesirable change in color appears to be due to hydrolytic and oxidative changes which accompany the sterilization of commercially canned green vegetables. In many cases, these degradative changes in canned vegetables are accelerated by the production of organic acids during thermal processing. Thus, the normal pH value for the fluids expressed from raw peas is about 6.6 to 7.0 whereas the product after sterilization ranges from 5.8 to 6.4. This decrease in pH constitutes an increase in acidity which causes the destruction of the natural green pigment during thermal processing and subsequent storage, i.e., the degradation of green colored chlorophyll to yellow-olive colored pheophytin.

Prior art processes for the retention of green color in canned green vegetables generally require an additive compound to achieve the color retention (i.e., to prevent the conversion of chlorophyll to yellow-olive colored pheophytin). These additives can be classified into two principal groups (1) alkalizing or alkalizing-buffering agents such as the hydroxides and carbonates of alkali and alkaline earth metals such as sodium, calcium and magnesium and (2) metallic salts such as the chlorides and acetates of zinc and copper.

For example, U.S. Pat. Nos. 1,908,795, 2,186,003, 2,189,774, 2,305,643 and 2,318,426 teach preserving the color of green vegetables by maintaining the canned product at an alkaline pH by incorporating alkaline reagents such as calcium hydroxide, magnesium hydroxide, magnesium oxide, magnesium carbonate in the blanch water and/or brine in which the vegetables are processed. U.S. Pat. No. 2,875,071 teaches incorporating a water soluble alkaline compound in the lining of cans in which green vegetables are packed whereby the alkaline compound, such as magnesium hydroxide, is slowly released into the brine to maintain the pH of the canned product at an alkaline level e.g., 8.0, and thereby preserve the green color.

In canning processes in which the color retention of the green vegetable is not dependent upon maintaining the pH at an alkaline level, a metal salt is added to the vegetable brine to provide metal ions to replace the magnesium ion lost from the chlorophyll during thermal processing of the green vegetable. For example, in an article entitled "Spectrophotometric Study of the Green Color in Okra," Association of Official Agricultural Chemists 26, 134–139 (1943) the authors report that the natural green color of okra is preserved during canning by the incorporation of a small amount of zinc chloride in the vegetable brine prior to sealing and thermal processing. The authors conclude that color stabilization is due to zinc ion replacing the magnesium ion lost from chlorophyll molecule during processing to effect the synthesis of a stable green compound.

In a second article entitled "Color Reversion in Processed Vegetables 1. Studies in Regreened Pea Purees" Journal of Food Science, 30, 312 (1965) the authors report the results of an investigation of a regreening phenomenon sometimes observed in the commercial vegetable packing industry. The authors had observed that green pea puree aseptically packed in glass jars and stored at 32° C. (90° F.), exhibited, after 6 months, a reversion to a green color which closely resembled the color of unprocessed peas. Analysis of pigment isolated from the puree indicated the formation of copper and zinc complexes. The authors then formed zinc and copper complexes by refluxing, for 20-60 minutes, pea puree to which zinc and copper compounds had been added at levels of 5 to 100 parts per million (ppm).

Although the art discussed above discloses a variety of processes for the retention of natural color in green vegetables, none of these processes are in current commercial use. A recent patent, U.S. Pat. No. 4,104,410, discloses that the drawback in the use of alkalizing agents for the retention of color in canned green vegetables is that the intensity of the retained green color decreases gradually when the canned green vegetable is kept in storage at room temperature. After about a 1 year storage period, due to the high pH level, an ammoniacal flavor (barn-yard flavor) develops. The patentee, who is also the patentee of U.S. Pat. No. 2,875,071, further discloses that brine additives such as salts and coordination compounds of zinc and copper are included in compounds which are toxic and not allowed in most countries as food additives. The process claimed in U.S. Pat. No. 4,104,410 achieves green color retention in vegetables without the addition of chemicals wherein the conventional blanching step is eliminated from the canning process and the vegetable is maintained in an aerobic environment at a temperature below its thermal injury temperature, e.g., 120°–140° F. up to the time of sterilization and thereafter sterilized in a high (275°–425° F.) temperature/short time (HTST) process. The process disclosed in U.S. Pat. No. 4,104,410 is also not in commercial use.

There is a need in the art for a canning process for green vegetables wherein color retention is achieved without the drawbacks mentioned in U.S. Pat. No. 4,104,410. For example, consumer research studies have shown a direct correlation between the color of green vegetables and the consumers perceived taste satisfaction. Many different stimuli contribute to the taste satisfaction of green vegetables and, according to the research, the foremost among these is natural fresh color. The only method known today to preserve the natural color of green vegetables is freezing. Frozen vegetables are costly to process and store and, because of rising energy costs, will be even more costly in the future.

Recent research (1981) by the National Food Processors Association has compared the effect of cooking on the nutrient content of vegetables such as peas and spinach in raw, frozen and canned form. The results showed that after cooking there was no real difference between canned and frozen vegetables and only small nutritionally insignificant differences existed between canned and fresh vegetables in most of the 23 nutrients tested.

SUMMARY OF THE INVENTION

It has now been found that the natural color of green vegetables can be preserved during storage which comprises blanching the vegetable at a temperature of about 150° to about 212° F. in water having incorporated therein a metal ion selected from zinc and copper ions and thereafter packing and storing the blanched vegetables in containers.

Once blanched in accordance with the practice of the present invention the vegetables may be stored in accordance with any conventional storage procedure. Thus the blanched vegetables may be packed into containers, the containers hermetically sealed and the vegetables sterilized therein. Alternatively the blanched vegetables may be frozen and subsequently thawed for canning and sterilization or merely thawed, cooked and consumed. As a further alternative, the blanched vegetables may be sterilized and then aseptically packaged.

As will hereinafter be illustrated, the method of the present invention provides an immediate stabilization of the natural green color of the vegetable. Adding the same metal ions to the brine in which the vegetables are packed will, over an extended period of time, regreen discolored green vegetables. However, because color restoration in the brine occurs over an extended period of time, the packed product will exhibit different, uncontrolled levels of greeness, imparting a color inconsistency to the vegetable which the consumer associates with low quality and dubious freshness. By achieving color stabilization in the blanching step of the vegetable canning process, the problem of differing color levels after canning and storage is minimized. By avoiding the substantial use of alkaline compounds the problem of off-flavor development on storage previously encountered with alkaline reagents, as observed in U.S. Pat. No. 4,104,410, is substantially eliminated.

PREFERRED EMBODIMENTS

Green vegetables which are to be canned according to the present invention are treated in a conventional blancher with hot water having a zinc or copper salt dissolved therein. The raw vegetables are blanched in hot water for the time and temperature suitable for that variety to effect the expulsion of occluded gases, activate or inactivate enzymes and effect the metal ion reaction. The temperature of the blanch is generally between about 150° and about 212° F. and the duration of the blanch is for a suitable period of time, this time period varying somewhat with the character of the vegetable being canned. About three to about fifteen minutes at about 170° to about 190° F. is a preferred time in the canning of green beans, peas and spinach.

In general, the metal ions in the form of metal salts are incorporated in the blanch water at concentration levels which will raise the metal ion content of the vegetable product to a level which is at least twice the original metal ion content of the vegetable prior to blanching, such concentrations being generally in the range of about 50 to about 500 ppm, and preferably about 100 to 200 ppm computed as metal ion. The metal ion level of the vegetable will be raised depending on the temperature of the blanch, the time of blanch and the concentration of metal ion in the blanch water. For example, green peas which in the untreated state had a zinc ion content of about 2-5 ppm, after being blanched at about 190° F. for about 5 minutes in water containing 47 ppm zinc ion contained about 33 ppm zinc ion after thermal processing.

Geographical variation in waters used for blanching may affect the availability of zinc for retention of green color. For example, waters exhibiting high water hardness may cause some precipitation of the available zinc ion such as the formation of zinc carbonate. The availability of zinc ion may be controlled by the addition of chelating agents and/or control of blanch water pH. This has been demonstrated by use of hydrochloric acid and acetic acid for control of pH and the addition of citric acid and lactic acid which form stable complexes of zinc.

The salts of zinc and copper useful in carrying out the practice of the present invention include the salts exhibiting high water solubility such as zinc and copper chloride, copper and zinc sulphate, copper and zinc nitrate, copper and zinc citrate, copper and zinc acetate.

Many zinc and copper salts are non-toxic and Generally Recognized As Safe (GRAS) by the United States Food and Drug Administration and are included in the U.S. government's Recommended Dietary Allowances (RDA). A recent (July 28, 1982) article in the New York Times indicated that zinc is needed in trace amounts in the diet to assure normal health and development. According to the article, animal studies have shown that zinc deficiency during pregnancy may produce serious birth defects and fetal loss as well as abnormal behavorial development in surviving offspring. A survey of apparently normal children revealed that a sizeable portion had marginal zinc deficiencies and experienced such symptoms as taste insensitivity, poor appetite and retarded growth. Nutritional surveys of adults indicate that the intake of zinc generally falls below the RDA for all age and sex categories, with the average intake being only 46 to 63 percent of the RDA.

By the practice of the present invention, blanching with zinc ion containing solutions at concentration levels of 50 to 500 ppm zinc ion will incorporate about 40 to about 150 ppm zinc ion in the processed vegetables which will in addition to effecting color retention may provide a zinc supplement necessary for the consumers' diet.

In practicing the process of the present invention for the canning of green vegetables, the vegetable product, after blanching, is drained so as to be substantially free from adhering water and filled into cans by the use of conventional type of canning equipment.

A brine solution containing the proper concentrations of salt and/or sugar is added and the cans are then hermetically sealed in the usual manner. For example, with green peas, the sealed cans are placed in a continuous sterilizer and sterilized at 257° F. for 7.5 minutes. A rapid come-up time in the sterilizer, e.g., 3-5 minutes, is desirable and a rapid (1-2 minutes) and thorough cooling (for example down to 95° F.) is required after processing. It is preferred that during sterilization the canned product be agitated and/or rotated to effect uniform heat distribution through the canned contents. Agitating type retorts are commercially available and are preferred for use in accomplishing the sterilization. An example of such a commercially available agitating type retort is one sold under the tradename Sterilmatic by the FMC Corporation.

To further enhance the color stabilization of the canned vegetables, such as peas, it has been found advantageous to pack the metal ion blanched vegetables in a container wherein at least one wall surface thereof has incorporated therein or coated thereon an alkaline earth metal compound which will be slowly released to the vegetable brine. The level of alkaline earth metal salt coated on or incorporated in the container wall surface, as in a container formed from a thermoplastic resin such as polyethylene, polypropylene or polystyrene, is maintained at about 5 to about 20 or more milligrams (mg.) of alkaline earth metal compound per square inch ($in^2$) of container surface in contact with the vegetable brine.

In general, amounts of alkaline earth metal compound in excess of 20 mg/$in^2$ of container surface tend to be wasteful of material, but such amounts may be used if desired. The presence of an alkaline earth metal compound of less than about 5 mg/$in^2$ of container surface will not ordinarily enhance the effect of the metal ion blanch in securing color retention. A level of alkaline earth metal compound of about 5 to about 15 mg/$in^2$ of container surface is usually satisfactory in an ordinary 303/406 (3-3/16 inch diameter, 4-6/16 inch height) food can (about 16 ounce size).

To achieve this level of alkaline earth metal compound on the container wall surface, the alkaline earth metal compound may be incorporated in the thermoplastic resin from which a thermoplastic container is formed or the compound may be suspended in a conventional lacquer or enamel coating vehicle used for coating the interior of a metal can or end stock surface in an amount ranging from about 10% to about 60% by weight of the thermoplastic resin or coating vehicle and preferably 30 to 50% by weight. Larger amounts tend to be wasteful of material and tend to degrade the quality of the resin or coating vehicle.

Conventional food can enamels utilize as vehicles such natural and synthetic resins as alkyd resins, rosin, maleic acid modified resin, phenolic resins such as phenol/formaldehyde resins, alkyd-amino combinations, epoxy resins, acrylic resins and polyamide resins. Dehydrated castor oil, linseed oil and other conjugated oils are effectively used in combination with the natural and synthetic resins used as coating vehicles. Also added to these vehicles in small concentrations, e.g. 0.001%–0.005% by weight are driers such as cobalt and manganese naphthenate as well as pigment and fillers such as aluminum, mica and graphite in finely powdered form. Zinc oxide in relatively large concentrations, e.g., 10% to 15% by weight, may be incorporated in the enamel to improve the stain resistance of the enamel to sulfur bearing vegetables.

The alkaline earth metal salt when provided on the container wall surface in the manner described above migrates from the surface of the wall when in contact with the vegetable brine so that the alkaline earth metal compound becomes available to buffer and/or reduce the acidity rise in the sterilized container contents resulting from the oxidation or hydrolytic deterioration of the canned vegetable product during processing and storage.

The invention and advantages thereof will be readily understood from the following Examples:

EXAMPLE I

Tin-free steel can stock was coated with a conventional food can enamel (white pigmented acrylic). The enamel was baked and then can bodies were fabricated from the enamel coated plate. The side seam was powder striped and the cans were sprayed with a vinyl organosol interior coating.

Can ends fabricated to seal the cans were also prepared from tin free steel can stock which had been coated with a conventional epoxy-phenolic enamel coating.

In a series of tests, frozen peas (Perfection variety) were thawed and blanched in water containing 500 ppm metal ion derived from a variety of different metal salts. The peas were subjected to this blanching solution at a temperature of about 180° to 190° F. for about 6 minutes. The peas were cooled with cold tap water, drained, sorted and packed into the spray enameled cans together with a preheated (180° F.) brine composed of 1% NaCl and 2% sucrose.

The closed cans were sterilized in a still retort for 11 minutes at 260° F. The cans were cooled with water to about 95° F. The pH of the brine in the sterilized product was found to range from 5.1 to 6.4, depending on the metal salt used in the blanching treatment.

After the cans were processed in this manner, the cans were opened and the contents of the opened cans evaluated for color on a rating scale of 0 to 10; a rating of 0 was assigned to the yellow-olive color of conventionally processed peas and a color rating of 10 was assigned to the color of freshly blanched peas, the rating of 1 through 9 representing increasing increments in the intensity of the green color of the processed peas. The color ratings assigned to the blanched and processed peas stored for 24 hours at room temperature as well as after 1 month storage at 55° C. (131° F.) are summarized in Table I below. One month storage at 55° C. is an accelerated test which normally will produce a change in the color of the vegetable equivalent to that encountered in the vegetable stored for extended periods under usual storage temperature conditions.

TABLE I

| | COLOR AFTER STORAGE | | | | | |
| --- | --- | --- | --- | --- | --- | --- |
| | 1 Day @ 23° C. | | | 1 Month @ 55° C. | | |
| Metal Salt Added To Blanch Water | Brine pH | Color of Peas | Color Rating | Brine pH | Color of Peas | Color Rating |
| None | 6.4 | Olive | 0 | 5.8 | Yellow-Olive | 0 |
| $ZnCl_2$ | 6.1 | Bt. Green* | 8 | 5.5 | Bt. Green | 7 |
| $CuSO_4.5H_2O$ | 5.8 | Bt. Green | 7 | 5.4 | Dk. Green** | 6 |
| $MnSO_4.H_2O$ | 6.4 | Lt. Green*** | 1 | 5.6 | Olive | 0 |
| $Cr(NO_3)_3.9H_2O$ | 5.5 | Dull Green | 2 | 5.3 | Dull Green | 1 |
| $CoCl_2.6H_2O$ | 6.3 | Dull Green | 2 | 5.2 | Dull Green | 1 |
| $NiCl_2.6H_2O$ | 6.1 | Dull Green | 2 | 5.5 | Dull Green | 1 |
| $Al(NO_3)_3.9H_2O$ | 5.3 | Yellow-Olive | 0 | 5.1 | Yellow-Olive | 0 |

TABLE I-continued

| Metal Salt Added To Blanch Water | COLOR AFTER STORAGE | | | | | |
|---|---|---|---|---|---|---|
| | 1 Day @ 23° C. | | | 1 Month @ 55° C. | | |
| | Brine pH | Color of Peas | Color Rating | Brine pH | Color of Peas | Color Rating |
| Cd₃SO₄.8H₂O | 6.2 | Olive | 0 | 5.5 | Olive | 0 |
| Fe(NO₃)₃.9H₂O | 5.1 | Olive | 0 | 5.0 | Olive | 1 |
| FeSO₄.7H₂O | 6.2 | Dk. Green | 3 | 5.5 | Olive | 0 |

*Bright Green;
**Dark Green;
***Light Green

By reference to Table I it is immediately apparent that peas blanched in accordance with the process of the present invention, i.e., wherein zinc or copper salts are added to the blanch water, retained their green color (color rating of 7 to 8) even after the processed peas had been stored at 55° C. for 1 month (color rating 6 to 7), whereas, peas blanched in blanch water containing metal salts other than zinc or copper exhibited a low order of green color (i.e. a color rating of 0 to 3) 1 day after processing and deteriorated to a rating 0 to 1 after storage for 1 month at 55° C.

EXAMPLE II

The procedure of Example I was repeated using fresh peas (varieties designated by the numerals 079 and 3040) in a cannery using commercial canning equipment. The 303×406 containers used were cans having welded bodies manufactured from tin-free steel plate with an internal epoxy phenolic coating and a vinyl epoxy amine side seam stripe. The ends were manufactured from tin-free steel and coated internally with a conventional food grade enamel. Blanch conditions were 190° F. for 6 minutes. Zinc chloride was added individually to the blanch water, the brine or both the blanch water and brine at concentrations varying from 50-200 ppm zinc ion. The zinc treated peas were sterilized at 255° F. for 7.48 minutes.

The color ratings of the peas are summarized in Table II below.

TABLE II

| Run* No. | Zn++ Concentration (ppm) in | | | Color Rating After Storage @ 23° C. | |
|---|---|---|---|---|---|
| | Blanch Water | Brine | Peas after Processing | 1 Day | 4 Months |
| 1 | 0 | 0 | 3 | 0 | 0 |
| 2 | 0 | 50 | 62 | 3 | 0 |
| 3 | 0 | 100 | 62 | 3 | 0 |
| 4 | 0 | 200 | 110 | 3 | 0 |
| 5 | 200 | 0 | 560 | 5 | 5 |
| 6 | 200 | 50 | 640 | 5 | 5 |
| 7 | 200 | 100 | 690 | 5 | 5 |
| 8 | 200 | 200 | ** | 5 | 5 |
| 9 | 0 | 0 | 5 | 3 | 0 |
| 10 | 0 | 50 | 39 | 4 | 0 |
| 11 | 0 | 100 | 69 | 4 | 0 |
| 12 | 100 | 0 | 160 | 5 | 2 |
| 13 | 100 | 50 | 180 | 5 | 3 |
| 14 | 100 | 100 | 240 | 5 | 3 |

*Runs 1-7 variety 079; Runs 8-13 variety 3040
**Result not determined

By reference to Table II it is immediately apparent that although the incorporation of zinc ion in the brine provided a marginal improvement in color stabilization (Run Nos. 2-4, 10-11), maximum stabilization of the green color of the processed peas occurred when the zinc ion is incorporated in the blanch water (Run Nos. 5, 12) and the addition of zinc ion to the brine of peas which had already been blanched with a zinc ion solution provided no improvement in color retention (Run Nos. 6-8, 13-14).

EXAMPLE III

The procedure of Example II was repeated with the exception that the enamel coating applied to the interior surfaces of the can body and end had suspended therein 45% by weight magnesium oxide having a particle size of 325 mesh to provide 6-7 mg. magnesium oxide per square inch of can surface. 250 ppm CaO was added to the brine to control pH during processing. After processing, the brine pH was measured to be 7.6. In the absence of CaO addition, the pH of the processed brine is normally about 6.1.

The fresh peas (variety 3040) packed in the cans were blanched at 200° F. for 6 minutes with dilute solutions of zinc chloride containing Zn++ at concentrations of 50 to 100 ppm. The blanched peas were sterilized in a Sterilmatic at 255° F. for 7.48 minutes. The results of these tests are recorded in Table III below.

The procedure of Example III was repeated with the exception that a standard can enamel (i.e., the same enamel used in Example I) was employed for the packing of the peas. The results of these tests are also recorded in Table III.

The procedure of Example III was repeated with the exception that 50 ppm Zn++ as ZnCl₂ was added to the brine. The results of these tests are also recorded in Table III. The results of control tests, designated by the symbol "C", are also recorded in Table III.

TABLE III

| Run No. | Can Variable | | Zn++ Concentration (ppm) | | | Color Rating After Storage @ 23° C. | |
|---|---|---|---|---|---|---|---|
| | Std° | MgO** | In Blanch | In Brine | In Peas | 1 Day | 4 Months |
| 1 | X | — | 100 | 0 | 160 | 5 | 2 |
| 2 | — | X | 50 | 0 | 71 | 6 | 3 |
| 3 | — | X | 100 | 0 | 140 | 8 | 5 |
| 4 | — | X | 50 | 50 | 79 | 6 | 3 |
| 5 | — | X | 100 | 50 | 170 | 8 | 3 |
| C₁ | X | — | 0 | 0 | 5 | 0 | 1 |
| C₂ | — | X | 0 | 0 | — | 7 | 2 |

°Standard can enamel used.
**MgO loaded can enamel used.

By reference to Table III it is readily apparent that the joint use of a zinc ion blanch and a MgO loaded can enamel resulted in a higher color rating for the processed peas. The presence of zinc ion in the brine did not enhance the color rating of the processed peas.

EXAMPLE IV

The procedure of Example II was repeated with the exception that frozen peas were used as the pea source. The thawed peas were blanched at 180° to 190° F. for 6 minutes. Sterilization conditions were 260° F. for 11 minutes in a still retort. Zinc ion was added to the blanch water as $ZnCl_2$ at concentrations varying from 100 to 510 ppm zinc ion. The color ratings of the processed peas are recorded in Table IV below.

To determine the effect of $Zn++$ incorporated in the brine, the procedure of Example IV was repeated wherein $Zn++$ as zinc chloride was added to the brine to which the zinc ion blanched peas were packed.

For purposes of contrast, the procedure of Example IV was repeated with the exception that either no zinc ion was added to the blanch water or zinc ion was added to the brine instead of the blanch water. The color ratings of these comparative runs, designated by the symbol "C", are also recorded in Table IV below.

TABLE IV

| | $Zn++$ Concentration (ppm) | | | Color Rating After Storage | |
|---|---|---|---|---|---|
| Run No. | In Blanch Water | In Brine | In Peas After Processing | 1 Day @ 23° C. | 1 Month @ 55° C. |
| 1 | 50 | 0 | 37 | 1 | 2 |
| 2 | 50 | 46 | 61 | 2 | 3 |
| 3 | 80 | 0 | 59 | 3 | 5 |
| 4 | 80 | 46 | 74 | 4 | 6 |
| 5 | 100 | 0 | 93 | 5 | 5 |
| 6 | 190 | 0 | 120 | 5 | 8 |
| 7 | 190 | 46 | 170 | 6 | 9 |
| 8 | 200 | 0 | 190 | 7 | 6 |
| 9 | 510 | 0 | 420 | 8 | 7 |
| $C_1$ | 0 | 0 | 3 | 0 | 0 |
| $C_2$ | 0 | 10 | — | 0 | 0 |
| $C_3$ | 0 | 50 | — | 0 | 0 |
| $C_4$ | 0 | 100 | — | 0 | 0 |
| $C_5$ | 0 | 200 | — | 1 | 1 |

By reference to Table IV it is immediately apparent that the incorporation of 50 to 510 ppm $Zn++$ in the blanch water as $ZnCl_2$ produced a material improvement in the green color of the processed peas (Run Nos. 1, 3, 5, 6, 8, 9) and that the additional incorporation of $Zn++$ in the brine of the canned pea causes only a marginal further increase in green color (Run Nos. 2, 4, 7).

The absence of $Zn++$ in the blanch water produced processed peas with a yellow-green color (Run No. $C_1$) this color was obtained even though 10 to 200 ppm $Zn++$ was added to the brine (Run Nos. $C_2$–$C_5$).

EXAMPLE V

The procedure of Example I was repeated with the exception that frozen green beans were substituted for frozen peas. The beans were thawed and then blanched at 160° to 170° F. for 5 minutes. The blanched beans were sterilized using a still retort (no rotation of cans) for 13 minutes at 250° F. The color ratings of the processed beans are recorded in Table V below.

TABLE V

| | $Zn++$ Concentration (ppm) | | Color Rating After Storage | |
|---|---|---|---|---|
| Run No. | In Blanch | In Beans After Processing | 1 Day @ 23° C. | 1 Month @ 55° C. |
| 1 | 47 | 33 | 4 | 7 |
| 2 | 91 | 71 | 5 | 8 |
| 3 | 170 | 85 | 6 | 9 |
| Control | 0 | 2 | 0 | 0 |

The data in Table V show that the zinc ion blanch is effective in improving the color rating of processed green beans.

EXAMPLE VI

Due to differing growing, soil and harvesting conditions as well as the purpose for which the bean is grown, (e.g., disease resistance, yield), green beans appear in the commercial market in a multitude of varietal forms. To determine the effect of the metal ion blanch on different varieties of green beans, fresh green beans grown under a wide spectrum of conditions were subjected to a zinc ion blanch. The beans were blanched at 170° F. for 5 minutes using a ratio of 8 pounds of beans per 16 liters of water.

The blanch water was prepared by dissolving therein 6.4 grams of $ZnCl_2$ to provide a theoretical level of 200 ppm $Zn++$. The beans were filled into 303×406 cans to a nominal weight of 8.8 ounces. The filled cans were filled with a commercial brine, closed and then processed in a Sterilmatic at 251° F. for 14.7 minutes. The color ratings of the processed beans are recorded in Table VI below.

For purposes of contrast, the procedure of Example VI was repeated with the exception that no zinc salt was added to the blanch water. The results of these comparative tests designated "Control" are also recorded in Table VI below.

TABLE VI

| | $Zn++$ Concentration (ppm) | | Color Rating After Storage | |
|---|---|---|---|---|
| Green Bean Variety | In Blanch | In Beans After Processing | 1 Day @ 23° C. | 1 Month @ 55° C. |
| Early Gallitin | 190 | 25 | 2 | 4 |
| Early Gallitin (control) | 0 | 4 | 0 | 0 |
| Raider | 200 | 66 | 4 | 6 |
| Raider (control) | 0 | 4 | 0 | 0 |
| Lancer | 180 | 50 | 3 | 5 |
| Lancer (control) | 0 | 2 | 0 | 0 |
| Slenderette | 180 | 42 | 4 | 5 |
| Slenderette (control) | 0 | 3 | 0 | 0 |
| Blue Lake 47 | 200 | 67 | 5 | 6 |
| Blue Lake 47 (control) | 0 | 2 | 0 | 0 |
| Early Bird | 200 | 74 | 7 | 8 |
| Early Bird (control) | 0 | 2 | 0 | 0 |
| Checkmate | 200 | 56 | 6 | 6 |
| Checkmate (control) | 0 | 3 | 0 | 0 |
| Blue Lake 53* | 100–125** | 51 | 8 | 9 |
| Blue Lake 53 (control) | 0 | 3 | 0 | 0 |
| Blue Lake 94 | 180 | 66 | 7 | 7 |
| Blue Lake 94 (control) | 0 | 4 | 0 | 0 |

*Commercial blancher 400 lbs. beans/600 gallons water.
**Range in $Zn++$ concentration of blanch water from the beginning to the end of the run.

The data in Table VI indicate that the color response of zinc blanched green beans is variety dependent. While all varieties benefit from the zinc blanch treatment, the results with Early Bird, Blue Lake 53 and Blue Lake 94 were markedly better. The color of these three varieties was stable upon prolonged storage.

EXAMPLE VII

The procedure of Example VI was repeated with the exception that fresh spinach was substituted for frozen beans. The can enamel employed was the same as that in Example I. The spinach was blanched at about 180° F. for 6 minutes. The blanched spinach was sterilized using a still retort for 48 minutes at 260° F. The color ratings of the processed spinach are recorded in Table VII below.

TABLE VII

| Run No. | Zn++ Concentration (ppm) in Blanch Water | Zn++ Concentration (ppm) in Spinach After Processing | Color Rating After Storage 1 Day @ 23° C. | Color Rating After Storage 1 Month @ 55° C. |
| --- | --- | --- | --- | --- |
| 1 | 0 | 4* | 0 | 0 |
| 2 | 50 | 80 | 2 | 2 |
| 3 | 200 | 180 | 5 | 5 |

*Fresh Spinach contained 11 ppm Zn++

The data in Table VII indicate that a marked improvement in color was obtained by use of a zinc blanch (Runs 2 and 3) as compared to the control (Run No. 1). In addition, the green color of the zinc blanched spinach remained stable on prolonged storage.

What is claimed is:

1. A method for retaining the natural color of green vegetables which comprises subjecting said vegetable to a blanch solution for a period of time sufficient to blanch said green vegetable, said blanch solution containing a metal ion selected from the group consisting of zinc and copper ions, said metal ion being present in an amount sufficient to secure color retention in the blanched vegetable, said blanch solution being at a temperature of about 150° F. to about 212° F., and thereafter packing the vegetable in a container.

2. The method of claim 1 wherein the blanched vegetables are hermetically sealed in a container and then thermally sterilized in the container.

3. The method of claim 1 wherein the metal ion is incorporated in the blanch water in an amount which is sufficient to raise the metal ion content of the vegetable product to a level which is at least twice the original metal ion content of the vegetables prior to blanching.

4. The method of claim 1 wherein the metal ion concentration in the blanch solution is about 50 to about 500 parts per million.

5. The method of claim 1 wherein the metal ion is zinc.

6. The method of claim 1 wherein the metal ion is copper.

7. The method of claim 2 wherein the container has incorporated on at least one wall surface thereof an alkaline earth metal compound selected from the group consisting of an alkaline earth metal salt, an alkaline earth metal oxide and an alkaline earth metal hydroxide, and then heating the container at a temperature of about 240° to 300° F. for a time sufficient to sterilize the vegetables packaged in the container.

8. The method of claim 7 wherein the alkaline earth metal compound is incorporated in a coating applied to the surface of the container at a concentration in the range of about 10 to about 60% by weight of the coating.

9. The method in claim 7 wherein the alkaline earth metal compound is present at the surface of the interior container walls at a concentration in the range of about 5 to about 20 milligrams per square inch of container wall surface.

10. The method of claim 7 wherein the compound is magnesium oxide.

11. The method of claim 7 wherein the vegetable is green peas.

12. The method of claim 1 wherein the vegetable is green beans.

13. The method of claim 1 wherein the vegetable is green peas.

14. The method of claim 1 wherein the vegetable is spinach.

* * * * *